United States Patent
Kim

(10) Patent No.: US 7,529,573 B2
(45) Date of Patent: May 5, 2009

(54) SLIDE APPARATUS OF SLIDE-TYPE PORTABLE TERMINAL

(75) Inventor: Bong-do Kim, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 11/594,486

(22) Filed: Nov. 7, 2006

(65) Prior Publication Data

US 2007/0103851 A1 May 10, 2007

(30) Foreign Application Priority Data

Nov. 7, 2005 (KR) ................ 10-2005-0106198

(51) Int. Cl.
*H04M 1/00* (2006.01)
(52) U.S. Cl. .............. 455/575.4; 361/681; 248/920
(58) Field of Classification Search ........ 361/679, 361/681, 361; 455/575.4; 248/920
See application file for complete search history.

(56) References Cited

U.S. PATENT DOCUMENTS

| 7,003,104 | B2* | 2/2006 | Lee ............... 379/433.13 |
| 7,046,297 | B2* | 5/2006 | Chou ............... 348/375 |
| 7,102,881 | B2* | 9/2006 | Park et al. ............ 361/683 |
| 7,215,556 | B2* | 5/2007 | Wrycraft ............ 361/802 |
| 7,218,509 | B2* | 5/2007 | Liao et al. ............ 361/679 |
| 7,257,432 | B2* | 8/2007 | Nan ............... 455/575.4 |
| 7,376,449 | B2* | 5/2008 | Mizuta et al. ............ 455/575.3 |

| 2004/0157653 | A1 | 8/2004 | Kato |
| 2005/0119034 | A1 | 6/2005 | Kato et al. |
| 2005/0215298 | A1* | 9/2005 | Lee ............... 455/575.4 |
| 2006/0030381 | A1* | 2/2006 | Byun et al. ........ 455/575.4 |
| 2007/0010299 | A1* | 1/2007 | Lai et al. .......... 455/575.3 |
| 2007/0032278 | A1* | 2/2007 | Lee et al. .......... 455/575.4 |

FOREIGN PATENT DOCUMENTS

| CN | 1527566 | 9/2004 |
| EP | 1 519 544 | 3/2005 |
| KR | 2000-0017402 | 9/2000 |
| KR | 20-0370888 | 12/2004 |
| KR | 2005-0062284 | 6/2005 |
| KR | 100537699 | 12/2005 |
| WO | WO 02/063789 | 8/2002 |
| WO | WO 2005/020452 | 3/2005 |
| WO | WO 2007/026980 | 3/2007 |

* cited by examiner

*Primary Examiner*—Lisa Lea-Edmonds
*Assistant Examiner*—Ingrid Wright
(74) *Attorney, Agent, or Firm*—The Farrell Law Firm, PC

(57) ABSTRACT

Disclosed is a slide apparatus of a slide-type portable terminal in which a slide apparatus is integrally formed on both sides of a slide type housing. The slide apparatus of a slide-type portable terminal includes a body housing and a slide housing opened and closed from and to the body housing. The slide apparatus includes a pair of side guide members integrally formed with the body housing on both sides of the body housing in the lengthwise direction of the body housing; and a pair of side slide members integrally formed with the slide housing on both sides of the slide housing in the lengthwise direction of the slide housing and slidably engaged between the side guide members.

11 Claims, 6 Drawing Sheets

SLIDE APPARATUS OF SLIDE-TYPE PORTABLE TERMINAL

PRIORITY

This application claims priority under 35 U.S.C. §119 to an application entitled "SLIDE APPARATUS OF SLIDE-TYPE PORTABLE TERMINAL" filed with the Korean Intellectual Property Office on Nov. 7, 2005 and assigned Ser. No. 2005-106198, the contents of which are incorporated herein by reference.

BACKGROUND OF THE INVENTION

1. Field of the Invention

The present invention relates to a slide apparatus of a slide-type portable terminal which easily opens and closes a slide-type housing.

2. Description of the Related Art

In general, a "portable communication device" refers to an electronic device that a user can carry to perform wireless communication with a desired partner. Portable communication devices may be classified into various categories according to their appearance, such as a bar-type portable communication device, a flip-type portable communication device, and a folder-type portable communication device. A bar-type portable communication device refers to a device having a single housing of a bar-shape. A flip-type portable communication device refers to a device in which a flip is rotatably mounted to a housing by a hinge unit. A folder-type communication device refers to manner in which a folder is rotatably connected to a single bar-type housing by a hinge unit.

In addition, portable communication devices may be classified into a rotation-type portable communication device and a slide-type communication device according to the manner of opening and closing the portable communication device. The rotation-type portable communication device refers to a manner in which two housings are rotatably connected, in opposed relation to each other. The slide-type communication device refers to a manner in which two housings are slid with respect to each other in the lengthwise direction of the device. These variously classified portable communication devices can be easily understood by those skilled in the art.

As shown in FIG. 1, in the slide-type portable terminal 1, a main body 2 includes a plurality of keypads 2a and a microphone 2b. A slide body 3 is slid upward or downward by half the length of the main body 2 in order to open the portable terminal. Generally, the main body 2 has a 3 by 4 keypad, and a speaker 3a and a display unit 3b are provided on the front surface of the slide body 3.

As shown in FIG. 1, the conventional slide-type portable terminal 1 includes a main body, a slide body 3 which can be slid on the main body 2 by a predetermined length, and a plurality of torsion springs 4 provided between the slide body 3 and the main body 2, for providing resilient forces to slidably move the slide body 3 upward and downward with respect to the main body.

A main plate 2c is provided in the main body 2, and a slide plate 3c is provided in the slide body 3.

The main plate 2c and the slide plate 3c are screw-coupled to the bodies 2 and 3 so as to be fixed, respectively.

However, according to the conventional slide-type portable terminal, since the main plate is provided in the main body and the slide plate is provided in the slide body, the size and thickness of the plates cannot be reduced. Accordingly, since the size of the terminal is large, it is difficult to make the portable terminal slim and the design of the terminal is not appealing.

Further, since the plates are assembled to the bodies after they are assembled in advance, the assembling processes are difficult and assembly time is long.

Further, use of the plates increases the number of parts, thereby increasing the cost of the product.

SUMMARY OF THE INVENTION

Accordingly, the present invention has been made to solve the above-mentioned problems occurring in the prior art, and an object of the present invention is to provide a slide apparatus of a slide-type portable terminal which is integrally formed on both sides of a housing, thereby reducing the thickness of a terminal and thus making the terminal slim.

It is another object of the present invention to provide a slide apparatus of a slide-type portable terminal which is integrally formed on both sides of a housing, thereby reducing the number of parts, improving the assembly process, and reducing the manufacturing cost.

In order to accomplish these objects, there is provided a slide apparatus of a slide-type portable terminal having a body housing and a slide housing opened and closed from and to the body housing, the slide apparatus including a pair of side guide members integrally formed with the body housing on both sides of the body housing in the lengthwise direction of the body housing; and a pair of side slide members integrally formed with the slide housing on both sides of the slide housing in the lengthwise direction of the slide housing and slidably engaged between the side guide members.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment of the present invention will be described with reference to the accompanying drawings.

Figure 1:
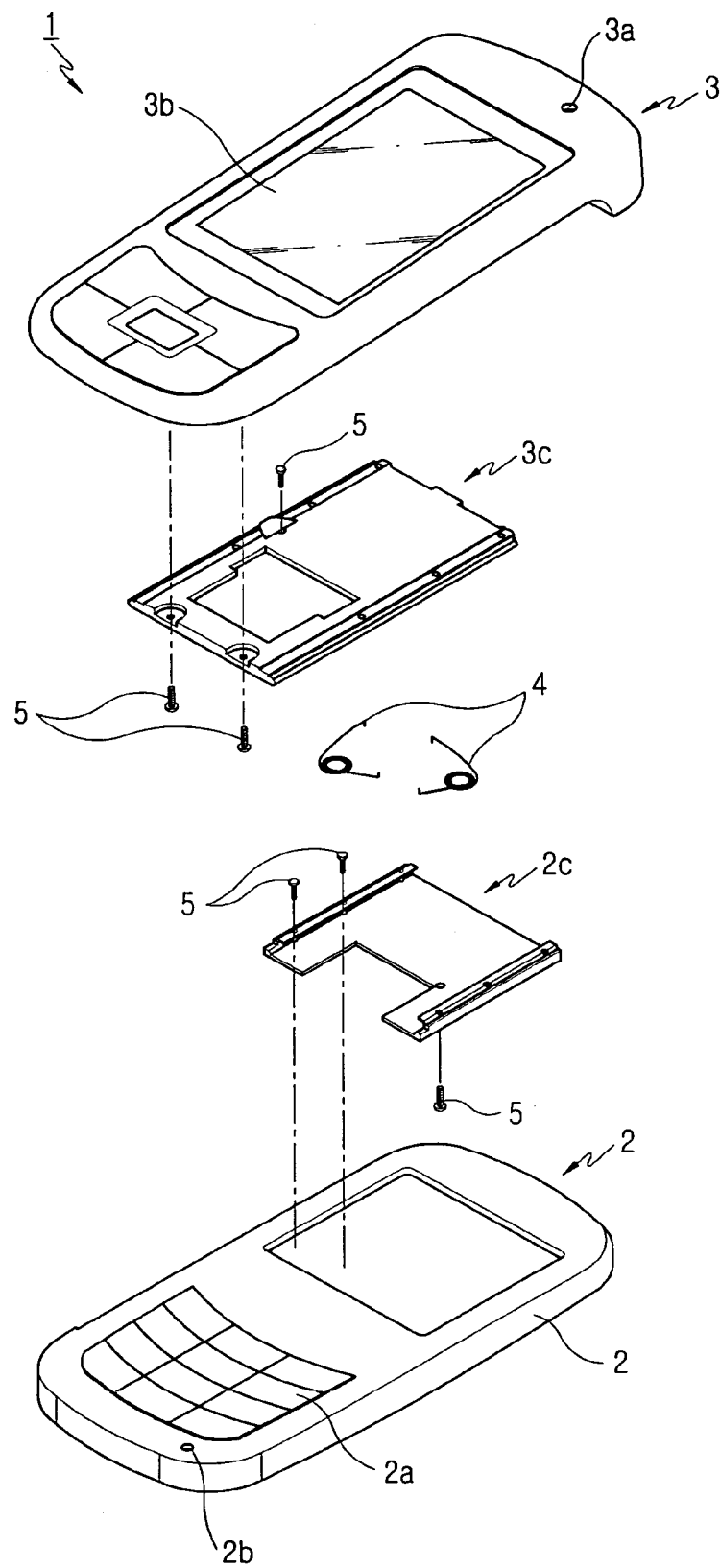
FIG. 1 is an exploded perspective view showing a slide apparatus of a conventional slide-type portable terminal.
Figure 2:
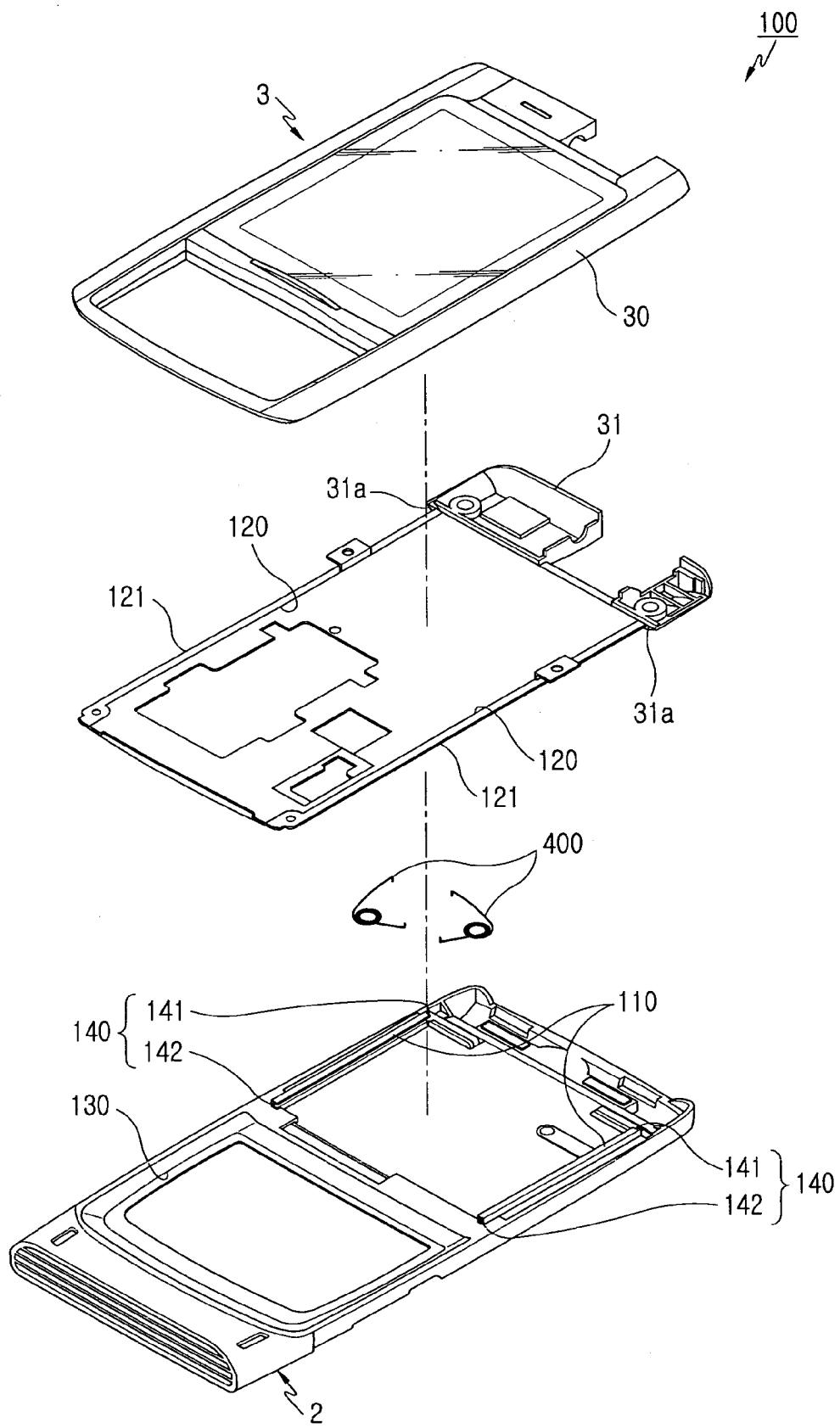
FIG. 2 is an exploded perspective view showing a slide apparatus of a slide-type portable terminal according to the present invention.
Figure 3:
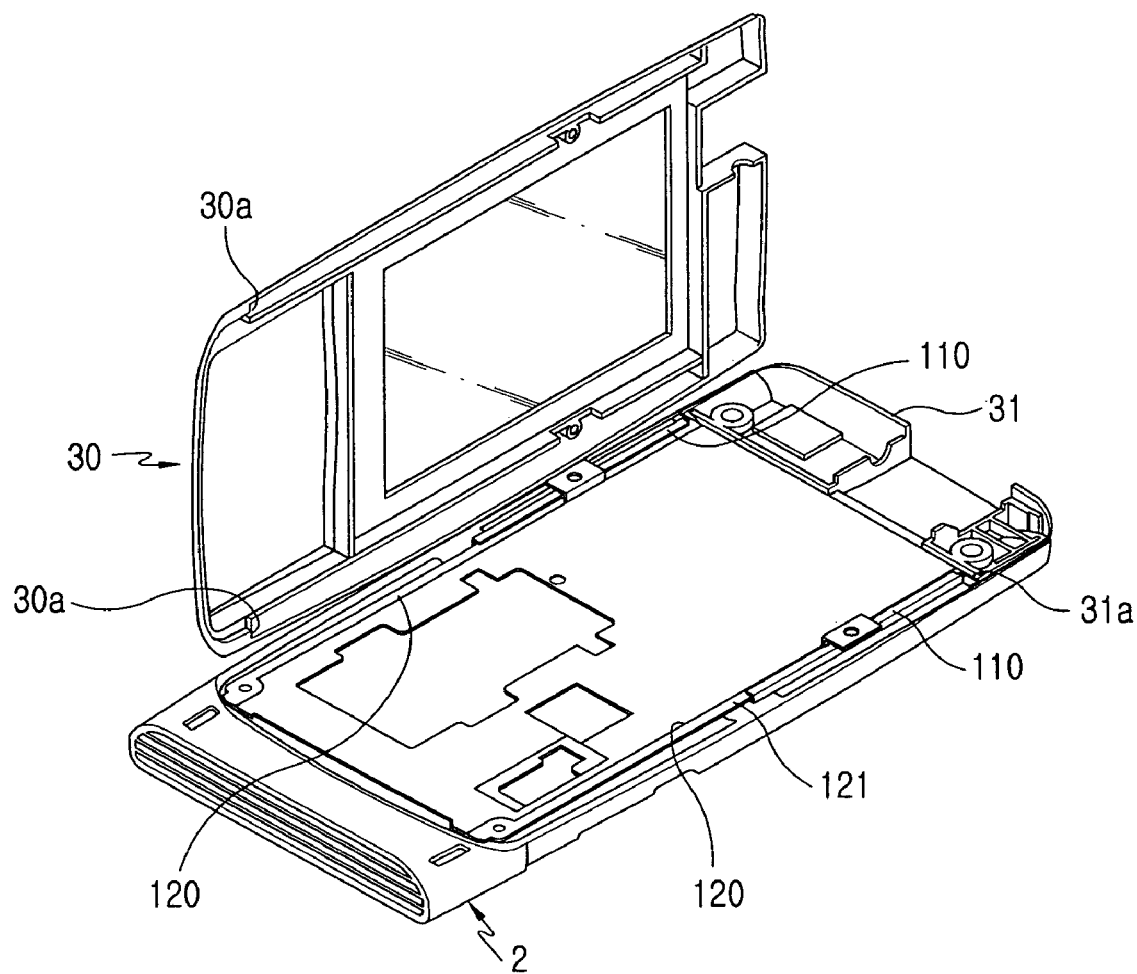
FIG. 3 is an exploded perspective view showing a slide housing of the slide apparatus of the slide-type portable terminal according to the present invention.

As shown in FIGS. 2 and 3, a slide apparatus 100 of a slide-type portable terminal according to the present invention includes a body housing 2, a slide housing 3 opened and closed from and to the body housing 2, a pair of side guide members 110, and a pair of side slide members 120. The side guide members 110 are integrally formed with the body housing 2 in the lengthwise direction of the body housing 2. The side guide members 110 are provided on both sides of the body housing 2 so as to be slidably engaged with the side slide members 120. The side slide members 120 are integrally formed with the slide housing 3 in the lengthwise direction of the slide housing 3. The side slide members 120 are provided on both sides of the slide housing so as to be slidably engaged between the side guide members 110.

Figure 4:
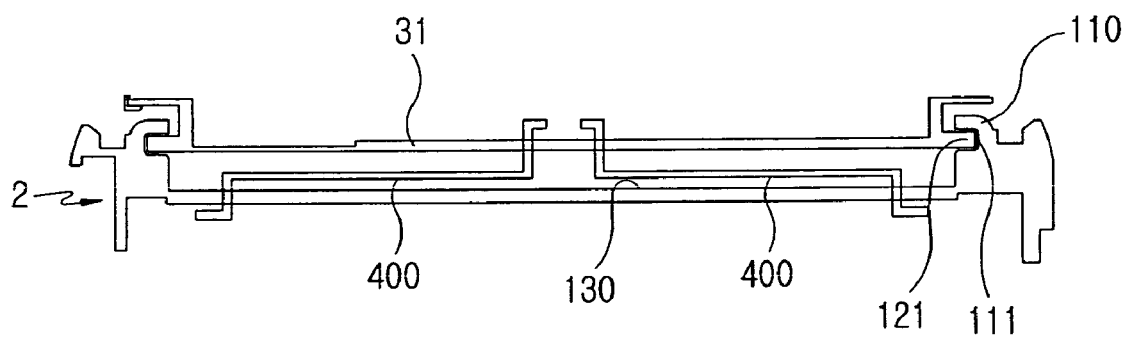
FIG. 4 is a side view showing the engaged state of the slide apparatus of the slide-type portable terminal according to the present invention.

FIGS. 2 and 4, a sliding movement recess 130, which is recessed a predetermined depth along the lengthwise direction of the body housing 2, is formed on the upper end surface of the body housing 2 in order to slidably guide the slide housing 3, with the body housing 2 facing the slide housing 3.

As shown in FIG. 4, the side guide member 110 is formed in the sliding movement recess 130, and a guide recess 111 is slidably engaged with a guide rail 121 formed in the side slide member 120.

As shown in FIG. 2, the slide housing 3 includes upper and lower cases 30 and 31, the side slide members 120 are formed on both sides of the lower case 31. The lower case 31 is formed of a metal or a material similar to a metal, so that the lower case can be slid. The lower case 31 functions as a case for receiving a printed circuit board (not shown) of a LCD module (not shown) provided in the slide housing 3 and as a guide for sliding movement with respect to the body housing 2.

Figure 5:
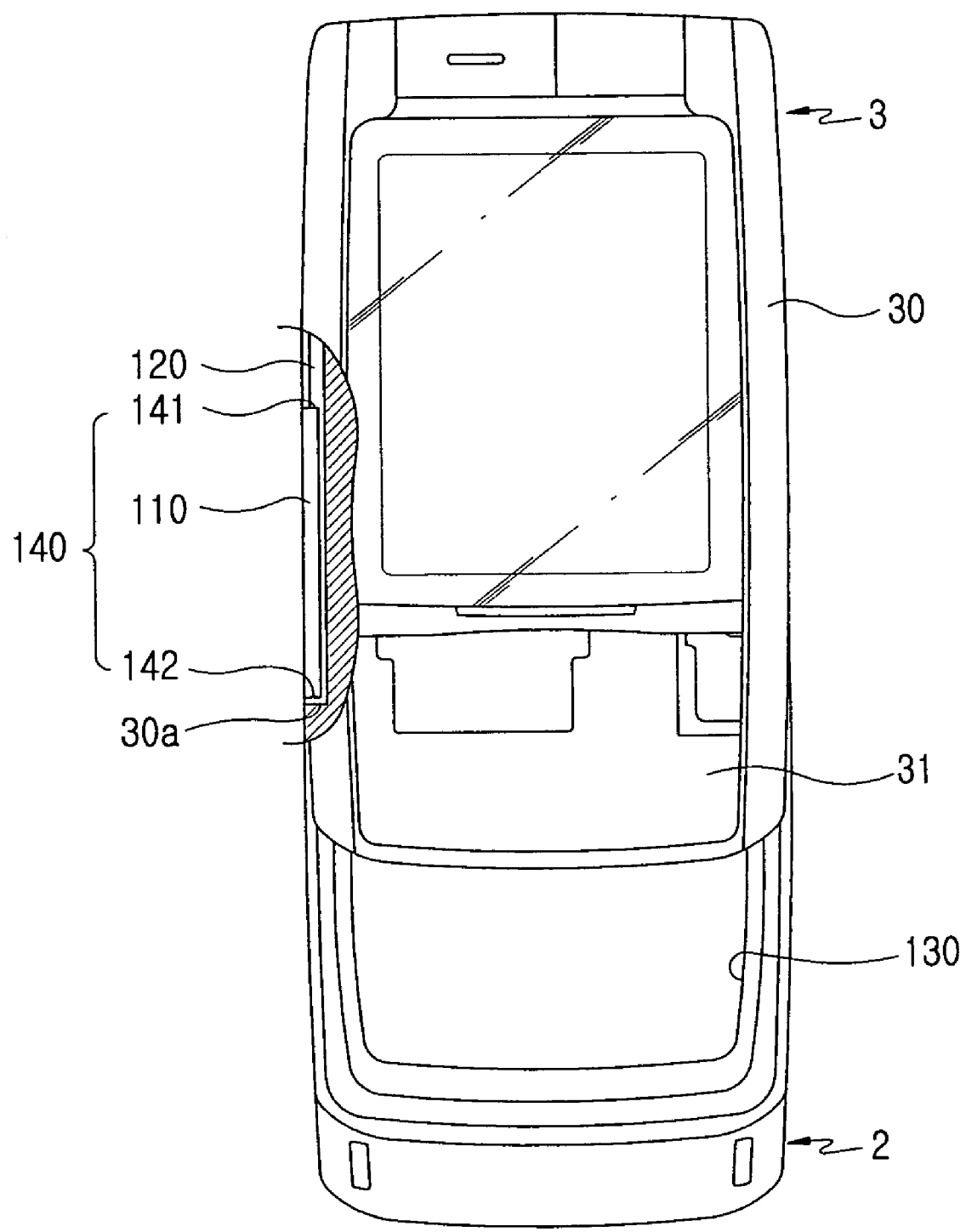
FIG. 5 is a plan view showing the state after the slide apparatus of the slide-type portable terminal according to the present invention is slid.
Figure 6:
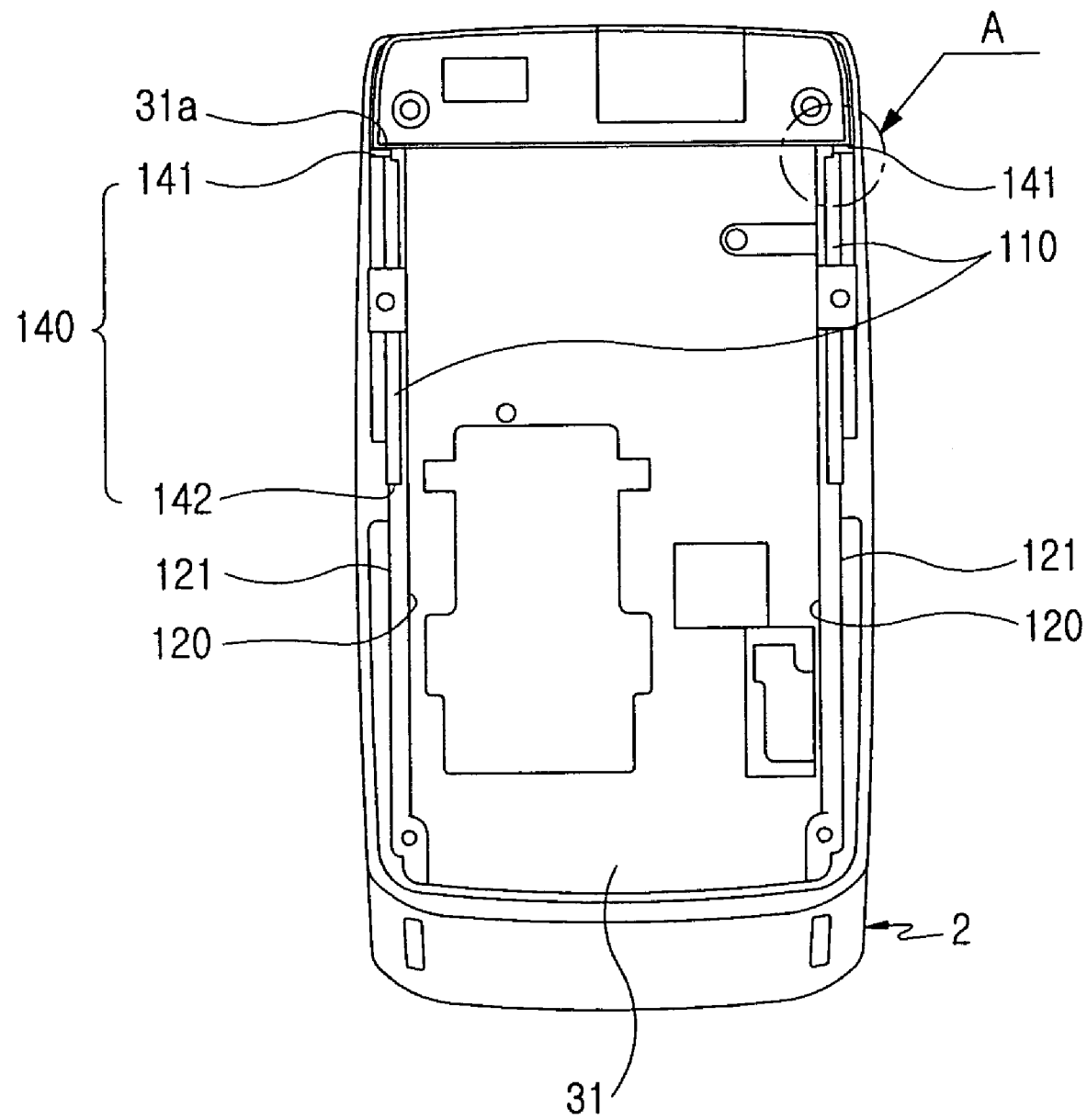
FIG. 6 is a plan view showing the state before the slide apparatus of the slide-type portable terminal according to the present invention is slid.

As shown in FIGS. 5 and 6, a stopper assembly 140, which makes contact with the upper and lower cases 30 and 31 of the slide housing 3 to stop the sliding movement, is formed in the side guide member 110. The stopper assembly 140 includes first and second stopper members 141 and 142.

Figure 7:
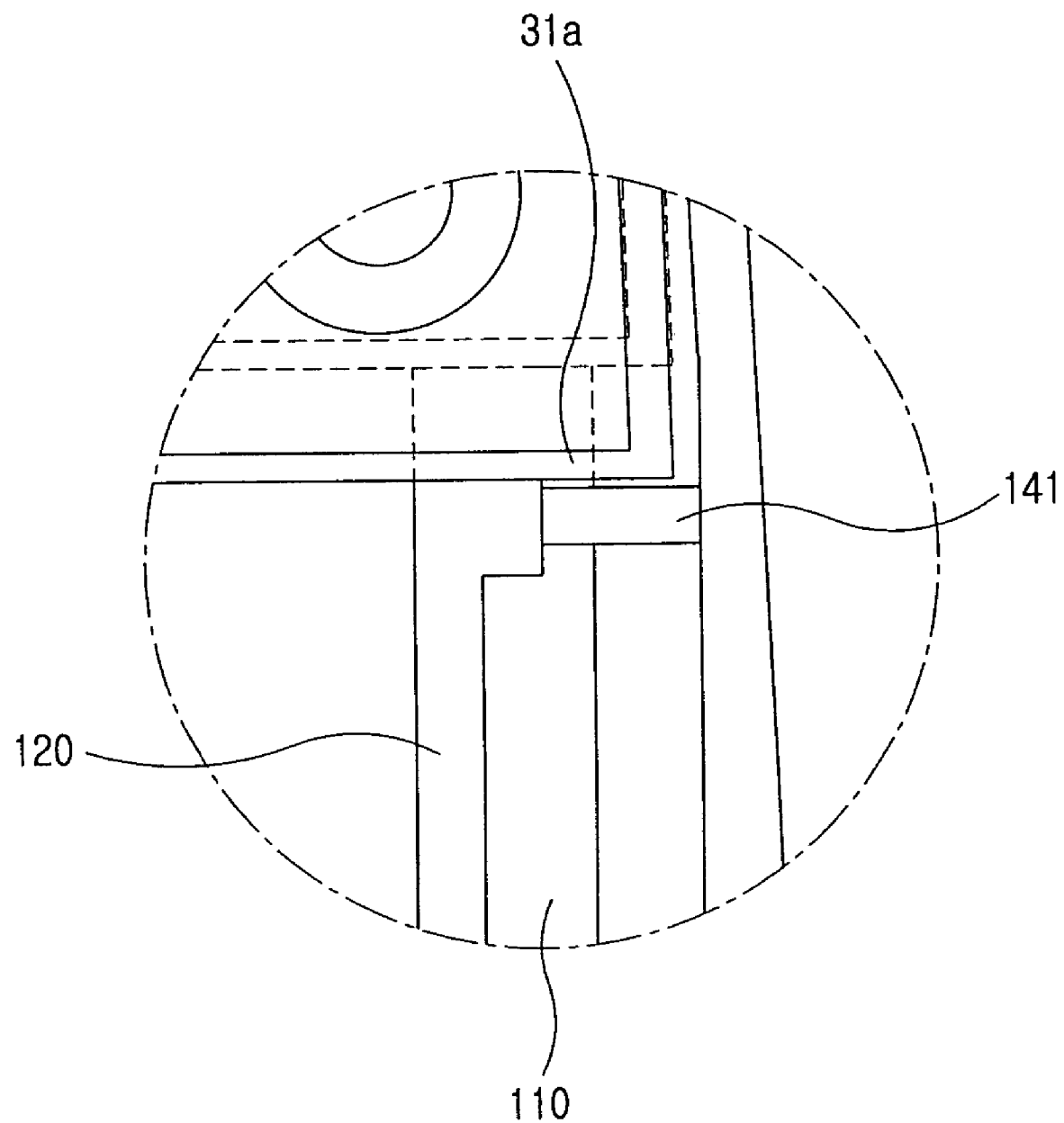
FIG. 7 is an enlarged plan view of a portion A of FIG. 6.

As shown in FIGS. 5 to 7, the first stopper member 141 is formed at the upper end of the side guide member 110 in order to make contact with the lower case 31 of the slide housing 3, thereby stopping the sliding movement. The second stopper member 142 is formed at the lower end of the side guide member 110, in order to make contact with the upper case 30 of the slide housing 3 to stop the sliding movement.

As shown in FIG. 6, a first contact portion 31a is formed in the lower case 31, so as to make contact with the first stopper member 141 when sliding the slide housing 3 in the direction close to the body housing 2.

As shown in FIG. 5, a second contact portion 30a is formed in the upper case 30, so as to make contact with the first stopper member 141 when sliding the slide housing 3 in the direction away from the body housing 2.

The first and second stopper members 141 and 142 are formed of a rubber material, in order to absorb impact while making contact with the first and second contact portion 30a and 31a.

Hereinafter, the operation of the slide apparatus of the slide-type portable terminal according to the present invention will be described in detail with reference to FIGS. 2 to 7.

As shown in FIGS. 2 and 3, the slide apparatus 100 of the slide-type portable terminal includes the body housing 2, a slide housing 3, at least one spring module 400, the pair of side guide members 110, and the pair of side slide members 120.

As shown in FIG. 4, one end of the spring module 400 is connected to the lower case 31 of the slide housing 3 and the other end thereof is connected to the body housing 2, in order to provide a driving force in the direction in which the body housing 2 is opened or closed.

As shown in FIGS. 3 and 4, since the sliding movement recess 130 recessed by a predetermined depth is formed on the upper end surface of the body housing 2, the slide housing 3 is slid in the state in which the slide housing 3 faces the sliding movement recess 130.

As shown in FIG. 2, the pair of side guide members 110 are provided in the sliding movement recess 130, and the side guide members 110 are integrally formed with the body housing 2 in the lengthwise direction of the body housing 2.

The slide housing 3 includes the upper and lower cases 30 and 31, and the side slide members 120 are formed on both sides of the lower case 31.

In this state, as shown in FIGS. 2 and 3, the pair of side slide members 120 provided in the lower case 31 of the slide housing 3 are slidably engaged with the side guide members 110. The guide rail 121 is formed in the side slide member 120, and is movably engaged with the guide recess 111 formed in the side guide member 110.

In this state, as shown in FIGS. 5 and 6, the slide housing 3 is slid in the direction in which the slide housing 3 becomes closer to and far away from the body housing 2. The stopper assembly 140 which makes contact with the first and second contact portions 30a and 31a formed in the upper and lower cases 30 and 31 of the slide housing 3 to stop the sliding movement is formed at one end of the side guide member 110.

As shown in FIG. 5, the stopper assembly 140 includes the first and second stopper members 141 and 142. If the slide housing 3 is slid in the direction in which the slide housing 3 moves away from the body housing 2, the upper and lower cases 30 and 31 of the slide housing 3 are also moved and the second contact portion 30a of the upper case 30 makes contact with the second stopper member 142 at the movement completion position, thereby stopping the sliding movement.

Here, as shown in FIGS. 6 and 7, if the slide housing 3 is slid in the direction in which it becomes closer to the body housing 2, the upper and lower cases 30 and 31 of the slide housing 3 are also moved and the first contact portion 31a of the lower case 30 makes contact with the first stopper member 141 at the movement completion position, thereby stopping the sliding movement.

The lower case is preferably formed of a metal or a material similar to a metal, in order to prevent the lower case from being twisted during the sliding movement thereof. For example, aluminum, stainless steel, or the like may be used.

As mentioned above, since conventional main and slide plates are excluded by slidably engaging the side guide member provided in the sliding movement recess of the body housing with the side slide member integrally provided in the slide housing, the thickness of the terminal and the number of parts of the terminal can be reduced, thereby making the terminal slim and improving the assembling process.

While a slide apparatus of a slide-type portable terminal according to the present invention has been shown and described with reference to a certain preferred embodiment thereof, it will be understood by those skilled in the art that various changes in form and details may be made therein without departing from the spirit and scope of the invention as defined by the appended claims.

What is claimed is:

1. A slide apparatus of a slide-type portable terminal having a body housing and a slide housing sliding to be opened and closed from and to the body housing, the slide apparatus comprising:

a pair of side guide members integrally formed with the body housing on both sides of the body housing in a lengthwise direction of the body housing;

a pair of side slide members integrally formed with the slide housing on both sides of the slide housing in a lengthwise direction of the slide housing and slidably engaged between the side guide members;

a stop assembly including first and second stopper members being formed in the body housing at respectively an upper and lower end of the side guide members for stopping sliding movement of the slide housing and absorbing impact of the stopping; and at least one spring module providing a driving force in the direction in which the body housing is opened and closed, the at least one spring module having two ends, one of the two ends being connected to the body housing, the other end being connected to the slide housing.

2. A slide apparatus according to claim 1, wherein a sliding movement recess of a predetermined depth along the lengthwise direction of the body housing is formed on an upper end surface of the body housing.

3. A slide apparatus according to claim 2, wherein the side guide member is formed in the sliding movement recess, and a guide recess slidably engaged with a guide rail formed in the side slide member is formed.

4. A slide apparatus according to claim 1, wherein the slide housing comprises upper and lower cases, and the side slide members are formed on both sides of the lower case.

5. A slide apparatus according to claim 4, wherein the lower case is formed of one of a metal material and a material similar to metal.

6. A slide apparatus according to claim 4, wherein the lower case receives a printed circuit board of an LCD module provided in the slide housing and guides sliding movement with respect to the body housing.

7. A slide apparatus according to claim 1, wherein the first and second stopper member stop the sliding movement in the directions respectively close to and away from the body housing.

8. A slide apparatus according to claim 7, wherein the first stopper member makes contact with the lower case of the slide housing to stop the sliding movement, and the second stopper member makes contact with the upper case of the slide housing to stop the sliding movement.

9. A slide apparatus according to claim 8, wherein a first contact portion making contact with the first stopper member is formed in the lower case, and a second contact portion making contact with the second stopper member is formed in the upper case.

10. A slide apparatus according to claim 8, wherein the first and second stopper members are formed of a rubber material.

11. A slide apparatus of a slide-type portable terminal having a body housing and a slide housing sliding to be opened and closed from and to the body housing, the slide apparatus comprising:

a side slide module integrally engaged with the sides of the housings so as to be slid in a lengthwise direction of the housings, the side slide module including a pair of side guide members integrally formed with the body housing on both sides of the body housing in a lengthwise direction of the body housing;

a stop assembly including first and second stopper members being formed in the body housing at respectively an upper and lower end of the side guide members for stopping sliding movement of the slide housing and for absorbing impact of the stopping; and at least one spring module providing a driving force in the direction in which the body housing is opened and closed, the at least one spring module having two ends, one of the two ends being connected to the body housing, the other end being connected to the slide housing.

* * * * *